United States Patent [19]
Johnson et al.

[11] 3,749,420
[45] July 31, 1973

[54] STABILIZED COUPLER FOR TRACTOR DRAWN TRAILERS

[75] Inventors: Wade M. Johnson, Huntsville, Tex.; Robert A. Ruckle, Ponca City, Okla.

[73] Assignee: Continental Oil Company, Ponca City, Okla.

[22] Filed: Apr. 5, 1972

[21] Appl. No.: 241,184

[52] U.S. Cl. ............................. 280/432, 188/271
[51] Int. Cl. ............................................. B62d 53/08
[58] Field of Search ................... 280/432; 188/271, 188/306

[56] References Cited
UNITED STATES PATENTS

| | | | |
|---|---|---|---|
| 3,512,803 | 5/1970 | Jaffe et al. | 280/432 R |
| 3,502,350 | 3/1970 | Pearson | 188/306 X |
| 3,439,936 | 4/1969 | Hines | 280/432 R |
| 3,420,548 | 1/1969 | Wakeman | 280/432 R |
| 3,420,547 | 1/1969 | Strausser | 280/432 R |
| 3,328,051 | 6/1967 | Hope et al. | 280/432 R |
| 2,959,429 | 1/1960 | Lavelle | 280/432 R |
| 2,940,572 | 6/1960 | Warman | 188/271 X |
| 2,528,076 | 10/1950 | Plaxco | 280/432 R |
| 2,170,898 | 8/1939 | Humphrey | 280/432 R |

Primary Examiner—Leo Friaglia
Assistant Examiner—R. Schrecengost
Attorney—Joseph C. Kotarski, William J. Miller et al.

[57] ABSTRACT

An anti-jackknifing mechanism which has a first reservoir filled with hydraulic fluid, a partition in the reservoir, and a kingpin axially mounted through the reservoir having a paddle attached to the kingpin in the reservoir. The kingpin is connected to the tractor used in hauling the trailer. The anti-jackknifing mechanism is improved by providing a lower expandable reservoir, a braking system below the expandable reservoir, and a communicating passageway between the upper reservoir and the lower reservoir such that, when sufficient pressure builds up in the upper reservoir caused by rapid movement of the trailer with respect to the tractor, the lower reservoir is expanded, forcing the braking mechanism together, thereby severely restricting the rotation or locking the trailer to the tractor.

6 Claims, 4 Drawing Figures

PATENTED JUL 31 1973 3,749,420

STABILIZED COUPLER FOR TRACTOR DRAWN TRAILERS

DESCRIPTION OF THE PRIOR ART

Many forms of stabilized couplers for tractor drawn trailers have been attempted. A system such as that shown in the U.S. Pat. No. to F. J. C. Hope et al., 3,328,051, illustrates an attempt to brake the fifth wheel by using an air sensor and braking means which locks the fifth wheel in an effort to prevent jackknifing of the trailer.

U.S. Pat. Nos. to Wakeman, 3,420,548; Strausser, 3,420,547; Lavelle, 2,959,429; and Hines et al., 3,512,803, utilize mechanical configurations which sense the jackknifing movement and attempt to lock the trailer's fifth wheel to stabilize the trailer and the towing vehicle.

The closest prior art to the concept in this application is the U.S. Pat. No. to Humphrey, 2,170,898. In this patent the fifth wheel incorporates a reservoir of oil. Mounted in the reservoir of oil is a paddle mechanically tied to the kingpin. A partition divides the oil reservoir into equal segments. An opening is formed through the paddle to permit a limited amount of oil to bypass the paddle. Thus, when the trailer moves under normal usage, the oil can bypass through the opening, permitting free movement of the trailer with respect to the tractor; however, when jackknifing occurs, insufficient oil can pass through the opening, thus preventing the trailer from moving rapidly enough to one side to cause a jackknifing situation.

The main problem with this patent is that there is no real means to lock the fifth wheel and prevent further rotation. Sufficient oil can escape through the opening to prevent sufficient restraining force of the fifth wheel, thereby inadequately locking it under jackknifing conditions.

BRIEF DESCRIPTION OF THE INVENTION

The anti-jackknifing stabilizer disclosed herein rigidly locks or severly retards movement of the fifth wheel of a tractor-trailer combination, preventing a jackknifing situation, by utilizing a reservoir similar to that shown in the Humphrey patent. Beneath the reservoir is mounted an expandable toroidal reservoir which in turn is connected to the Humphrey-type reservoir by a hydraulic coupling and valve. Under the expandable reservoir is mounted a disc brake which engages the fifth wheel. Thus, when a jackknifing situation occurs, the paddle will force hydraulic fluid into the toroidal expandable reservoir forcing the disc brake against the Kingpin upper plate rigidly clamping the trailer to the tractor. A controlled escape for the hydraulic fluid trapped in the expandable reservoir will prevent releasing the brake until the jackknifing situation has abated.

BRIEF DESCRIPTION OF THE DRAWINGS

Referring to the drawings.

DETAILED DESCRIPTION OF THE PREFERRED EMBODIMENT

Similar numbers will be used throughout the specification for similar elements whenever possible.

Figure 1:
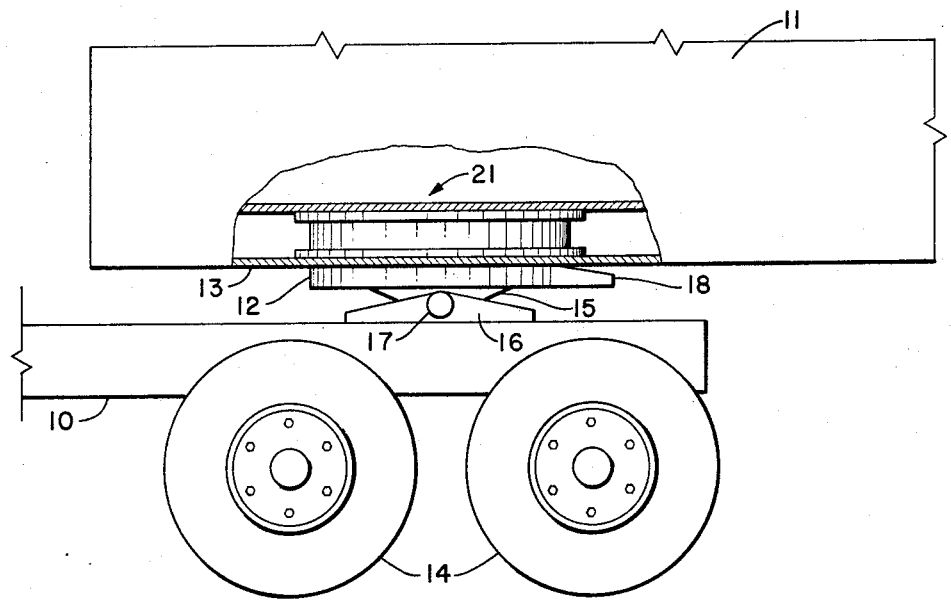
FIG. 1 is a partial section of the rear end of a tractor and forward end of a trailer showing a cutaway view of the trailer stabilizing means mounted therein.

Referring to all of the drawings but in particular to FIG. 1, a portion 10 of the rear chassis of a truck (not shown) is illustrated. A fifth wheel 12 is mounted above a pair of tandem rear wheels 14 by a bracket 15 attached to the fifth wheel, a bracket 16, and a shift 17 which permits pivotal rotation between bracket members 15 and 16. The fifth wheel includes an entrance passage 18 adapted to permit insertion of the kingpin 20 (see FIG. 2) to a central point on the fifth wheel 12, thereby permitting pivotal rotation of the kingpin 20 about fifth wheel 12. Mounted directly above the fifth wheel and preferably in a trailer 11 and attached to the Kingpin upper plate 13 of said trailer 11 is an anti-jackknifing mechanism generally referred to be the number 21.

Figure 2:
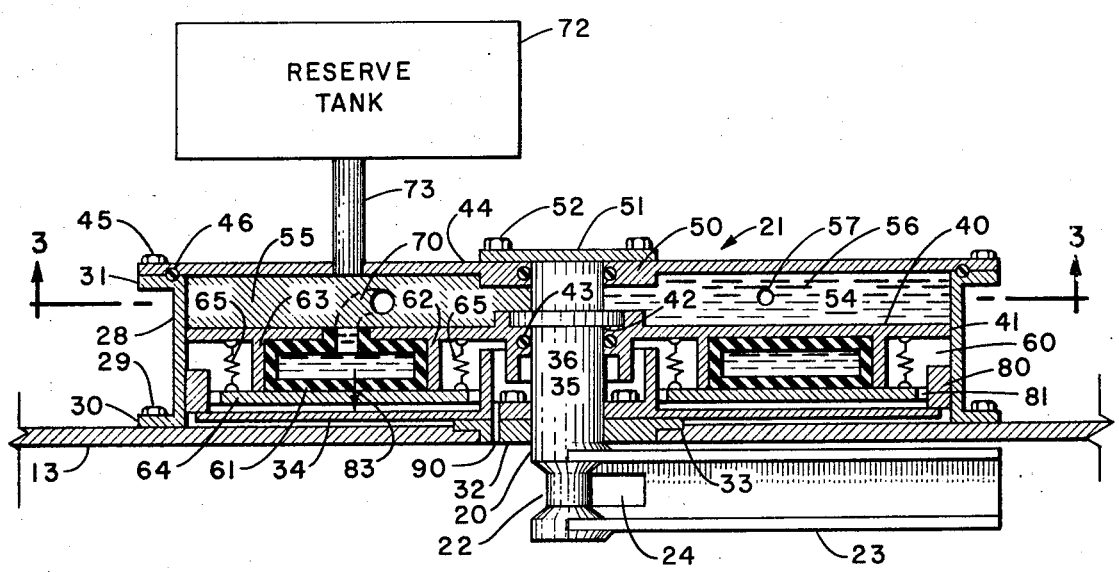
FIG. 2 shows a cross-section of the stabilizzer means with the kingpin in full view.

Referring to FIG. 2, a cross-sectional view of the anti-jackknifing mechanism 21 is illustrated and essentially comprises a kingpin 20 having a reduced portion 22 used in locking the trailer to the fifth wheel and an I-beam extension arm 23 mounted securely to kingpin 20 and extending from the reduced portion 22. I-beam 23 has a cutout portion 24 to facilitate locking of the trailer to fifth wheel 12. A cylindrical housing 28 is attached to Kingpin upper plate 13 by a plurality of bolts 29 passing through a flange 30 into Kingpin upper plate 13. Flange 30 is attached at its inner periphery to the outer periphery of cylindrical housing 28 by any usual means such as welding. A second flange 31 is attached to the top of cylindrical housing 28 in like manner as flange 30.

Kingpin 20 has secured thereto a first bearing 32 having a sliding surface 33. A disc-shaped brake drum 34 is attached to bearing surface 32 by a plurality of bolts 35. An upward cylindrical extension 36 attached at one end to brake drum 34 affords isolation for oil leaking into the lower portion of the anti-jackknifing assembly 21.

A disc-shaped partition 40 is mounted intermediate to the top and bottom of cylindrical housing 28 and welded along edge 41. Kingpin 20 has a bearing 42 mounted to said disc-shaped partition 40 and also includes a seal 43. A top or cover 44 is attached by means of a plurality of bolts 45 to flange 31. Cover 44 and kingpin upper plate 13 should be sealed to flanges 31 and 30, respectively, by any suitable means such as O-rings 46, gaskets, or other obvious types of seals. A bearing 50 is axially mounted in cover 44 and sealed with a cover 51. Cover 51 can be attached to cover 44 by bolts 52. The space between cover 44, partition 40 and cylindrical housing 28 defines an upper reservoir or chamber generally referred to as number 54. Mounted in upper reservoir 54 is a fixed partition 55 and a paddle 56, rigidly mounted to the kingpin. Paddle 56 can be attached to kingpin 20 by welding, by use of brackets, by the use of a slot and bolt or other obvious means. Paddle 56 contains an orifice 57.

The space between partition 40, floor 13, and cylindrical housing 28 defines a lower compartment 60. In lower compartment 60 is an expandable lower reservoir 61 having the configuration of a toroid. The toroidal reservoir 61 is confined between concentric cylindrical walls 62 and 63 which are attached to partition 40. A disc-shaped braking element 64 is mounted concentric to kingpin 20 and has an axial opening larger than the outer diameter of the upward cylindrical extension 36. A plurality of inner and outer springs 65 retains braking element 64 snugly against concentric cylindrical walls 62 and 63. A passageway 70 communicates between lower reservoir 61 and the valve 71 (see FIG. 3). A reserve tank 72 communicates with the upper reservoir through a pipe 73.

Figure 3:
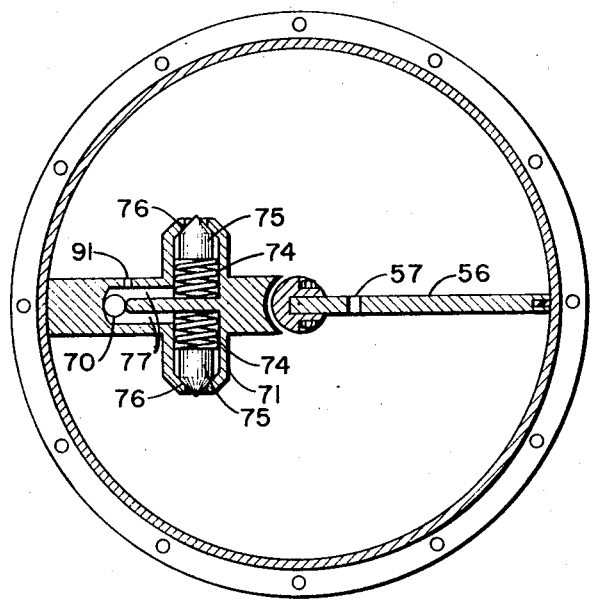
FIG. 3 is the top view of FIG. 2 taken through lines 3—3 of FIG. 2.

Referring to FIG. 3, valve 71 comprises a pair of springs 74, valve discs 75, and a valve seat 76. A pair of passageways 77 communicates with passageway 70 which, as previously mentioned, communicates with lower reservoir 61. A pair of blocks 80 is attached to the inner wall of cylindrical housing 28 and mates with a notch 81 formed in disc-shaped braking element 64.

OPERATION OF THE PREFERRED EMBODIMENT

Figure 4:
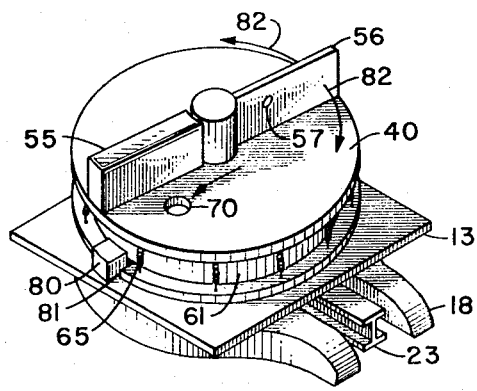
FIG. 4 is an illustrative schematic for illustrating the operation of the device described in detail in FIG. 2.

The operation of the preferred embodiment is best understood by referring to a simplified version illustrated in FIG. 4 and the detailed version shown in FIGS. 2 and 3. Under normal operation the trailer is supported by small under-wheels prior to the attachment of the tractor to the trailer. When the tractor is attached to the trailer, it is backed up so that kingpin 20 enters the opening formed by entrance passage 18 until kingpin 20 reaches the limit of passage 18, whereupon it is automatically locked into position by a mechanism well known in the art, and therefore not further described or shown here.

Once the trailer is locked into position and moves down the highway, ordinary turning by the truck will cause rotation of paddle 56 in the direction shown by arrows 82. Movement of the truck is transmitted to kingpin 20 through I-beam extension arm 23 which is moved arcuately by the sides of the entrance passage 18. Under normal operation, movement of paddle 56 in reservoir 54 is slow. Any pressure buildup in reservoir 54 between the paddle and partition 55 will be limited by the flow of oil through orifice 57. At this point it should be noted that the clearance by the paddle 56 between the cover 44, partition 40 and cylindrical housing 28 could be calculated to permit a prescribed amount of hydraulic fluid to bypass therebetween.

When the truck jackknifes, paddle 56 will begin a rapid movement in the direction of arrows 82 toward partition 55. The hydraulic pressure will increase, opening valve 71, permitting the hydraulic fluid to pass between valve seat 76 and valve disc 75 through passage 77 and passage 70 into lower reservoir 61. The increase in hydraulic fluid will cause reservoir 61 to expand. Since the concentric cylindrical walls 62 and 63 along with partition 40 have confined reservoir 61 on three sides, the reservoir can only expand in the direction of arrow 83. The expansion will be uniform throughout the toroidal reservoir since hydraulic fluid pressure is evenly distributed and, as a consequence, will force braking element 64 downwardly and uniformly against brake drum 34 with the brake in a clamped position. Any additional attempted rotation of kingpin 20 will be prevented by blocks 80.

Once the partial jackknifing has ceased and the truck is again stable, paddle 56 will attempt to return to its original position. Pressure will decrease between the paddle 56 and partition 55. Once the pressure has begun to reduce, the oil will pass back up passage 70 to passage 72 and around the valve seat 76 of valve 71. Springs 65 will disengage the braking element 64 from brake drum 34, releasing the trailer for normal operation.

The release of pressure from lower reservoir 61 can be accomplished in several ways. First, once the truck is stopped, the operator can release the pressure. Second, the pressure can be released by a small orifice such as 91 from passage 70 to the upper reservoir 54. Other obvious means can be used such as normal or designed leakage around valve seat 76.

It is obvious, viewing the above, that the advantage of the system disclosed over prior art systems is that, once the anti-jackknifing brake has been applied, it will hold until the danger of jackknifing has past.

The system is automatic and does not require some action on the part of the tractor driver.

Another advantage is that the braking system is positive, resulting in an extremely rigid coupling between the tractor and the trailer.

The additional oil needed from time to time is supplied by reserve tank 72. Any leakage around bearing 42 and seal 43 passes out a small hole 90.

It is obvious that embodiments can be made different from the particular disclosure of the preferred embodiment. For example, the increase in pressure of the first reservoir can be used as a trigger for a booster connected to said expandable reservoir. The hydraulics are well known in the art and clearly fall within the teachings of this invention. It is also obvious that other changes and modifications can be made in the anti-jackknifing apparatus disclosed herein and still be within the spirit of the invention as described in the specification and appended claims.

What I claim is:

1. An anti-jackknifing mechanism for a tractor-trailer combination, said tractor including a fifth wheel having means adapted to receive a kingpin mounted on said trailer, said mechanism having a first reservoir adapted to contain a fluid, a partition in said first reservoir, a kingpin axially mounted through said reservoir, an extension arm attached to said kingpin and receivable in said kingpin receiving means, a paddle attached to said kingpin whereby hydraulic fluid in said reservoir will be compressed between said partition and said paddle upon rapid movement of said paddle, the improvement comprising a lower expandable reservoir, braking means mounted adjacent said lower expandable reservoir, a braking surface mounted in close proximity to said braking means and a passageway communicating hydraulic fluid from said upper reservoir to said lower reservoir whereby an increase in the pressure in said upper reservoir will cause corresponding increase in the pressure in said lower reservoir, resulting in expansion of said lower reservoir, thereby urging said braking means rigidly against said braking surface.

2. An improvement in an anti-jackknifing apparatus as defined in claim 1 including a valve means in said first reservoir communicating between said upper reservoir and the passageway to said lower reservoir, said valve means opening upon a predetermined pressure permitting the passage of fluids from said upper reservoir to said lower reservoir.

3. A device as described in claim 1 comprising a plurality of springs attached to said braking means and biased to urge said braking means toward said second reservoir.

4. An anti-jackknifing apparatus for a tractor hauled trailer comprising:

a. a cylindrical housing having an upper and lower end, said cylindrical housing having a partition parallel to said upper end, defining an upper and lower chamber;
b. a cover over said upper and lower end;
c. a kingpin, said kingpin extending through said trailer, said lower end, said partition, and said upper end, said kingpin being journaled in each of said lower and upper ends and said partition;
d. a vertical partition between said kingpin and said housing in said upper chamber;
e. a vertical paddle means attached to said kingpin in said upper chamber;
f. an expandable reservoir positioned in said lower chamber next to said first-mentioned partition;
g. braking means between said expandable reservoir and said lower end;
h. fluid communication means between said upper chamber and said expandable lower reservoir; and
i. extension arm means rigidly attached to said kingpin whereby, when said upper chamber and expandable reservoir are filled with fluid, rapid rotation of the kingpin will cause the paddle to force fluid into said expandable reservoir and operate said braking means, thereby retarding or preventing further rotation of said kingpin.

5. An anti-jackknifing apparatus as described in claim 4 including a valve means in said fluid communication means, said valve means opening upon a predetermined pressure, permitting the passage of fluids from said upper reservoir to said lower reservoir.

6. A device as described in claim 4 including a plurality of springs attached to said braking means and biased to urge said braking means toward said second reservoir.

* * * * *